United States Patent
Griffiths et al.

(10) Patent No.: US 6,718,462 B1
(45) Date of Patent: Apr. 6, 2004

(54) SENDING A CD BOOT BLOCK TO A CLIENT COMPUTER TO GATHER CLIENT INFORMATION AND SEND IT TO A SERVER IN ORDER TO CREATE AN INSTANCE FOR CLIENT COMPUTER

(75) Inventors: Paul Griffiths, Austin, TX (US); Kenneth Eric Hubacher, Cedar Park, TX (US); Philip Charles Theiller, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/552,858

(22) Filed: Apr. 20, 2000

(51) Int. Cl.[7] ............................................. G06F 15/177
(52) U.S. Cl. ................................................. 713/2; 713/1
(58) Field of Search ................................. 713/1, 2, 100

(56) References Cited

U.S. PATENT DOCUMENTS

| | | | |
|---|---|---|---|
| 5,805,897 A | | 9/1998 | Glowny ....................... 395/712 |
| 5,852,722 A | | 12/1998 | Hamilton ................ 395/200.51 |
| 5,987,473 A | | 11/1999 | Jorgensen ..................... 707/104 |
| 6,052,720 A | * | 4/2000 | Traversat et al. ............ 709/220 |
| 6,108,779 A | * | 8/2000 | Dean et al. ...................... 713/2 |
| 6,209,089 B1 | * | 3/2001 | Selitrennikoff et al. ......... 713/2 |
| 6,466,972 B1 | * | 10/2002 | Paul et al. ................... 709/222 |

* cited by examiner

Primary Examiner—Thomas Lee
Assistant Examiner—Paul Yanchus, III
(74) Attorney, Agent, or Firm—David A. Mims, Jr.; Rudolf O. Siegesmund

(57) ABSTRACT

Client Discovery is a program that utilizes the existing remote boot capability of a network and adds a program to automate the discovery of a computer's class and the creation of an instance for that specific computer. When a client machine is connected to the network and turned on for the first time, the server will find its request for an operating system, identify that the machine does not have an instance and will send an CD boot block to the client computer. The CD boot block will obtain information about the client computer by automatically scanning everything that the program is able to scan. The client information gathering program may also prompt the user with questions and include those responses in the client information. The CD boot block will then send the information gathered to a log file in the server. One or more keys from the client information are compared to one or more keys in the template table. When a match is made, the server program executes a command to link the client machine's MAC address to the template creating an instance for the client computer and to save the instance in the server memory. The client machine will then reboot. When it restarts it will now be automatically identified by its instance and the appropriate operating system sent to it.

14 Claims, 4 Drawing Sheets

SENDING A CD BOOT BLOCK TO A CLIENT COMPUTER TO GATHER CLIENT INFORMATION AND SEND IT TO A SERVER IN ORDER TO CREATE AN INSTANCE FOR CLIENT COMPUTER

FIELD OF THE INVENTION

The present invention relates to the automatic discovery of a client computer's class and the creation of an instance of that class by a server in a remote boot environment.

BACKGROUND OF THE INVENTION

A computer or computer system, when turned on, must be prepared for operation by loading an operating system. If the computer has hardware associated with it, then appropriate drivers for the hardware of the computer must be loaded. In the normal operation of a single computer system, when a user issues a boot command to the computer, the computer responds to the boot command by attempting to retrieve the operating system files from the computer systems memory. Configuration data files are also needed to configure the specific machine with the hardware parameters necessary for the specific hardware configuration. These files also contain information needed to initialize videos, printers, and peripherals associated with the particular machine. For example, the files would include CONFIG.SYS in the MS-DOS operating system, available from Microsoft Corporation.

Computers or computer systems can be connected in a network normally consisting of a client workstation, a server and a central network. In a system where the computer's storage is maintained when the power is turned off, the operating system can be stored in the computer itself. In a system where the computer has only storage that is lost when the power is turned off, the computer cannot retrieve the boot information from within the computer itself. In that case, the client sends a request for the operating system files via the network to the server acting as a boot server. Even when the client workstation has non-volatile storage capability, it is advantageous to boot from the server because memory space is saved in the workstation computer. As operating system and application programs expand to provide new and greater capabilities, booting from a server can be highly advantageous.

Several methods of remote booting exist in the marketplace. One is called Remote Initial Program Load (RIPL). RIPL is the process of loading an operating system onto a workstation from a remote location. The RIPL protocol was co-developed by 3Com, Microsoft, and IBM. It is used today with IBM OS/2 Warp Server, DEC Pathworks, and Windows NT. Two other commonly used Remote IPL protocols are a Novell NCP (NetWare Core Protocol), and BOOT-P, an IEEE standard, used with UNIX and TCP/IP networks.

RIPL is achieved using a combination of hardware and software. The requesting device, called the requester or workstation, starts up by asking the loading device to send it a bootstrap program. The loading device is another computer that has a hard disk and is called the RIPL server or file server. The RIPL server uses a loader program to send the bootstrap program to the workstation. Once the workstation receives the bootstrap program, it is then equipped to request an operating system, which in turn can request and use application programs. The software implementations differ between vendors, but theoretically, they all perform similar functions and go through a similar process. The client workstation requires a special Read Only Memory (ROM) installed on its (Local Area Network) LAN adapter or Network Interface Card (NIC). The special ROM is known generally as a remote boot ROM, but two specific examples of remote boot chips are the RIPL chip, which supports ANSI/IEEE standard 802.2, and the Preboot Execution Environment (PXE) chip, which is used in the Transmission Control Protocol/Internet Protocol (TCP/IP) environment.

While remote booting is advantageous when all client computers are the same, it becomes problematical when the population of workstations consists of a wide variety of computer makes and models. In addition, the workstations may be connected to many different types of peripherals. In order to capitalize on the space saving advantages of remote booting, the server must know what operating system to send to a particular computer. The client computers can be divided into classes. For example, if there are ten computers in a network, five may be the same type and the remaining five computers may each be a different type. Therefore, there would be six classes of computers. Presently, identification of the class of a computer is accomplished by the system administrator who must manually enter information about each computer which will identify the class of the computer. The computer will receive an operating system based on the class to which the computer belongs. Once the administrator has identified the class of the computer he will execute a command that will link the computer's Medium Access Control (MAC) address to the class. By linking the computers MAC address with the class the administrator creates an instance for that computer within the class. Thus there is one instance for every computer in the network. In the previous example, based on ten computers, there were six classes of computers; however, there will be five instances of the first class and one instance for each of the remaining classes or ten instances in all. In RIPL based remote boot environment, the administrator creates the instance by executing the command RIPLMACH at the server which creates the instance and saves it to the server memory. When the client machine requests an operating system, the client machine will be recognized by its instance and the appropriate operating system will be sent. When only a few machines are in the network, it is not too burdensome for the system administrator to create the instance. However, in large networks and in networks where new machines are added routinely, the manual creation of an instance for each computer can be very burdensome. Therefore, a need exists for automation of the administrator's process of creating an instance for each machine to be in the network.

SUMMARY OF THE INVENTION

The invention meeting the needs identified above is a method and apparatus for Client Discovery (CD). Client Discovery is a set of programs that utilize the existing remote boot capability of a network and adds programs to automate the discovery of a computer's class and the creation of an instance within that class for that specific computer. When a client machine is connected to the network and turned on for the first time, the server will find its request for an operating system, identify that the machine does not have an instance and will send an CD boot block to the client computer. The CD boot block in a RIPL environment consists of Remote Initial Program Load Disk Operating System (RIPL DOS) and a client information gathering program. In a different remote boot environment, the CD boot block would consist of the RIPL DOS equivalent and the client information gathering program. The CD boot block will obtain information about the client computer by automatically scanning everything that the program is able to scan. The client information gathering program may also prompt the user with questions designed by the administrator and include those responses in the client information. The CD boot block will then send the information gathered to a log file in the server. The administrator will have created a set of keys. Keys identify the critical pieces of information that distinguish one class from another class. The server process then uses the keys to look for the critical information in the client information in the log file. When a match is made, the class of the computer is known and the computer is matched to a template which represents the information necessary to identify the operating system for that class and the server that would send the operating system. At the time the match is made, the server program then executes a command to link the client machine's MAC address to the template creating an instance for the client computer and to save the instance in the server memory. The client machine will then reboot. When it restarts it will now be automatically identified by its instance and the appropriate operating system sent to it. The process occurs each time a new machine is turned on in the network. The administrator only has to create the questions to be presented and set up the template table one time. After that the process takes place automatically without any intervention.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
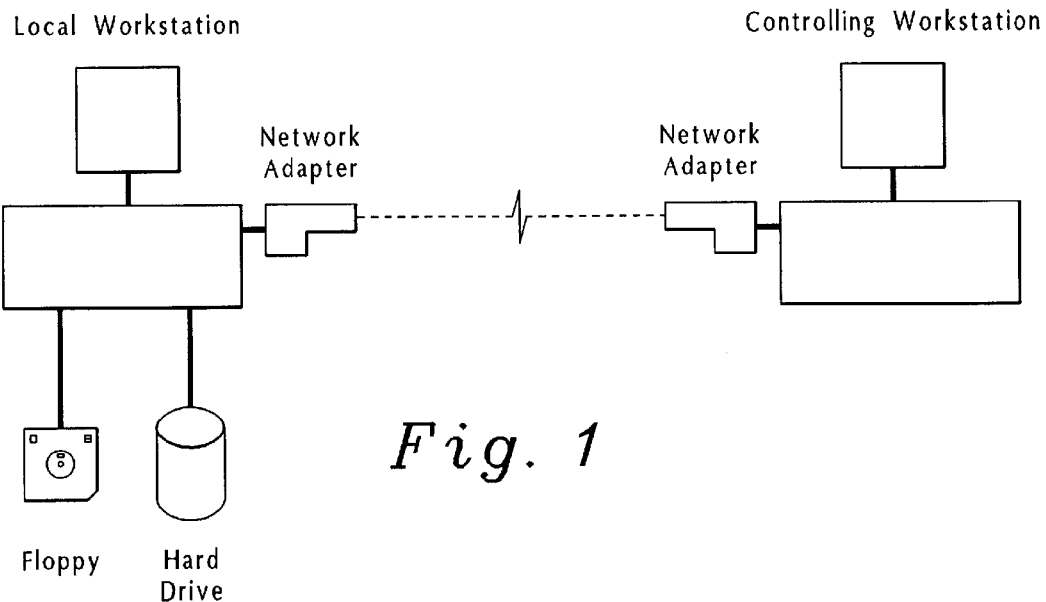
FIG. 1 depicts an overview of the system.
Figure 2:
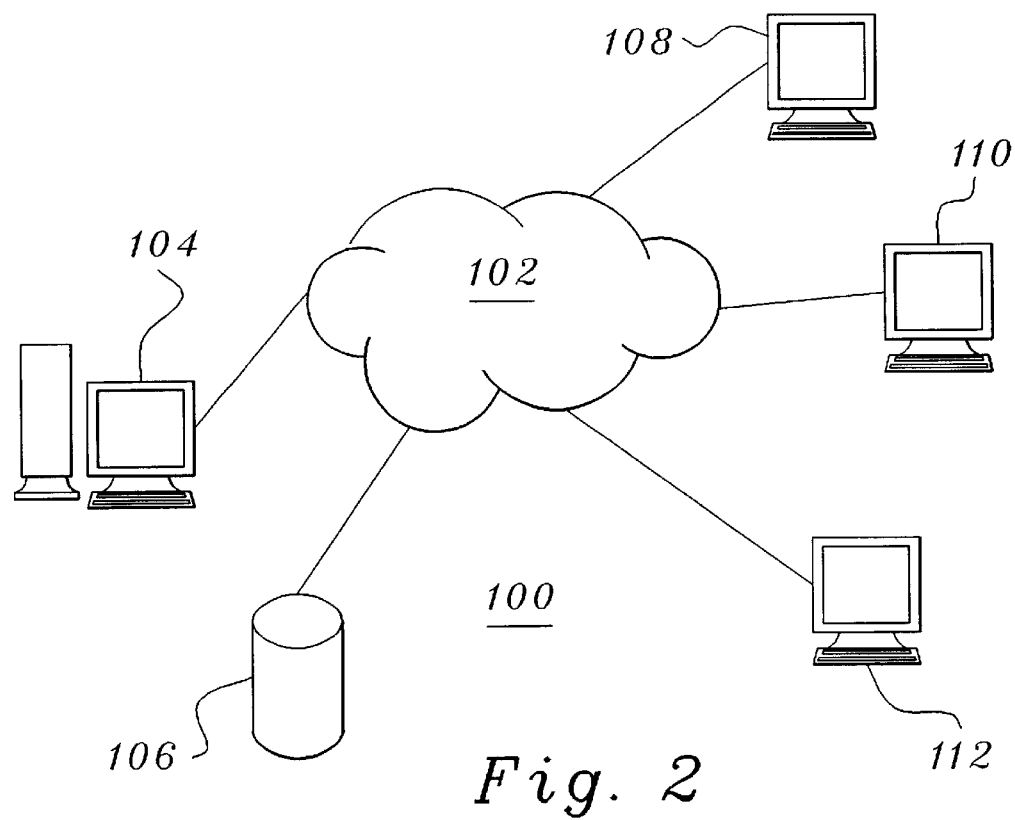
FIG. 2 depicts a distributed data processing system.

FIG. 1 depicts a pictorial representation of controlling workstation and a client workstation linked by a network. FIG. 2 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communications links between various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a network, which receives a program or other application from another computer coupled to the network. In the depicted example, server 104 provides data, such as boot files, operating system images, and applications to clients 108, 110 and 112. Clients 108, 110, and 112 are clients to server 104. Server 104 may also act as a boot server because it stores the files and parameters needed for booting each of the unique client computers systems 108, 110, and 112. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as for example, an intranet, a local area network (LAN), or a wide area network (WAN).

Figure 3:
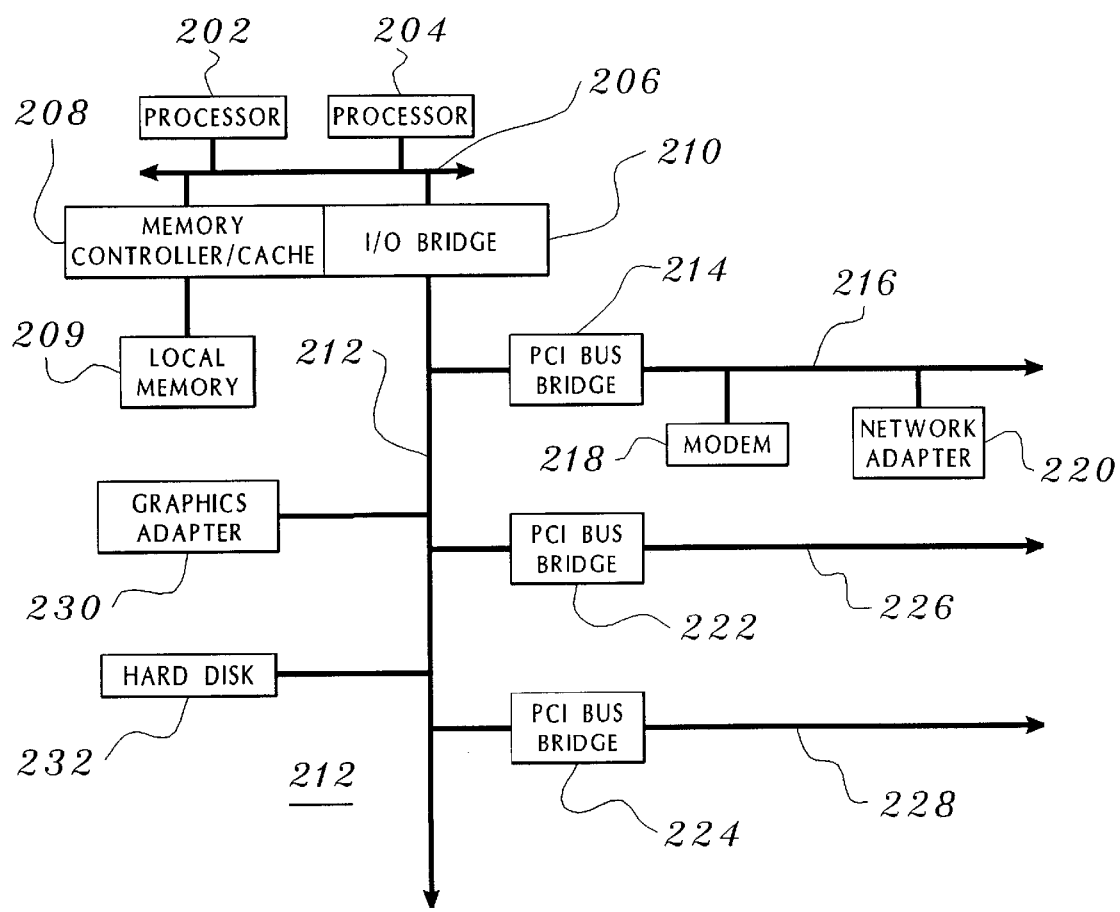
FIG. 3 depicts a block diagram of a server.

Referring to FIG. 3, a block diagram depicts a data processing system, which may be implemented as a server, such as server 104 in FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted Peripheral component interconnect (PCI) bus bridge 214 connected to I/O bus 212 provides an interface to PCI local bus 216. Modem 218 may be connected to PCT bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI buses 226 and 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as optical disk drives and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 4:
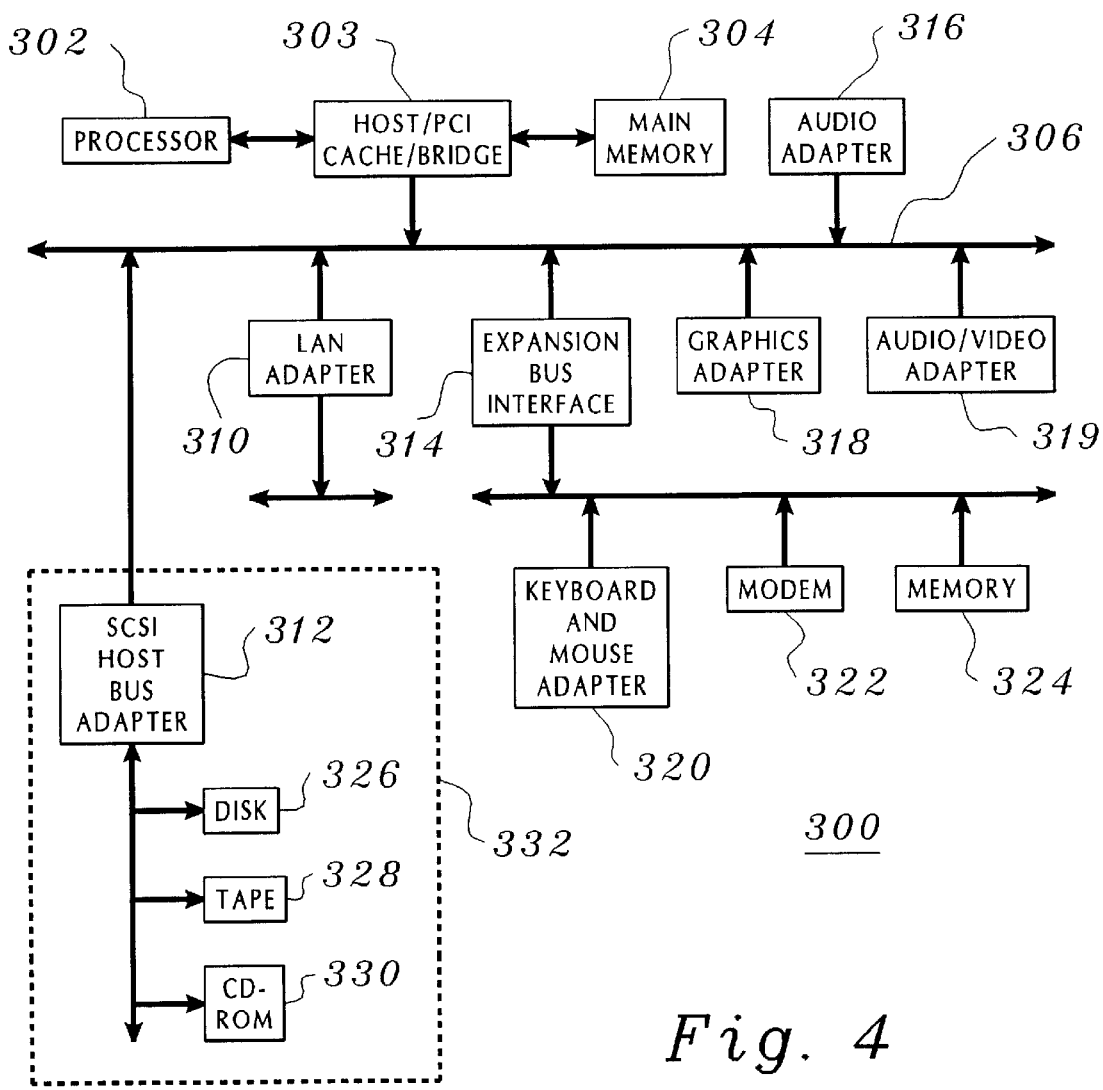
FIG. 4 depicts a block diagram of a work station.

With reference now to FIG. 4, a block diagram illustrates a data processing system in which the CD process may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 308. PCI bridge 308 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (A/V) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Inc. Instructions for the operating system, the object-oriented operating system, and applications or programs may be located on storage devices, such as hard disk drive 326, and they may be loaded into main memory 304 for execution by processor 302. Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if optionally configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It s important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 5:
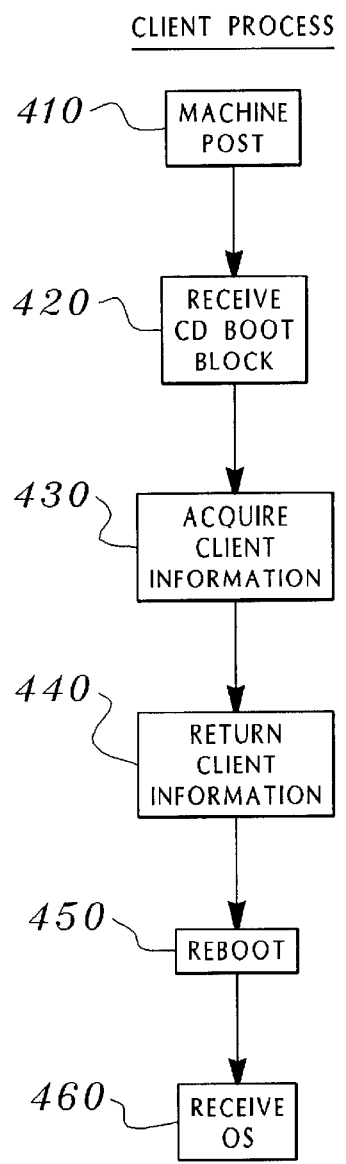
FIG. 5 depicts a flow chart of the workstation process.
Figure 6:
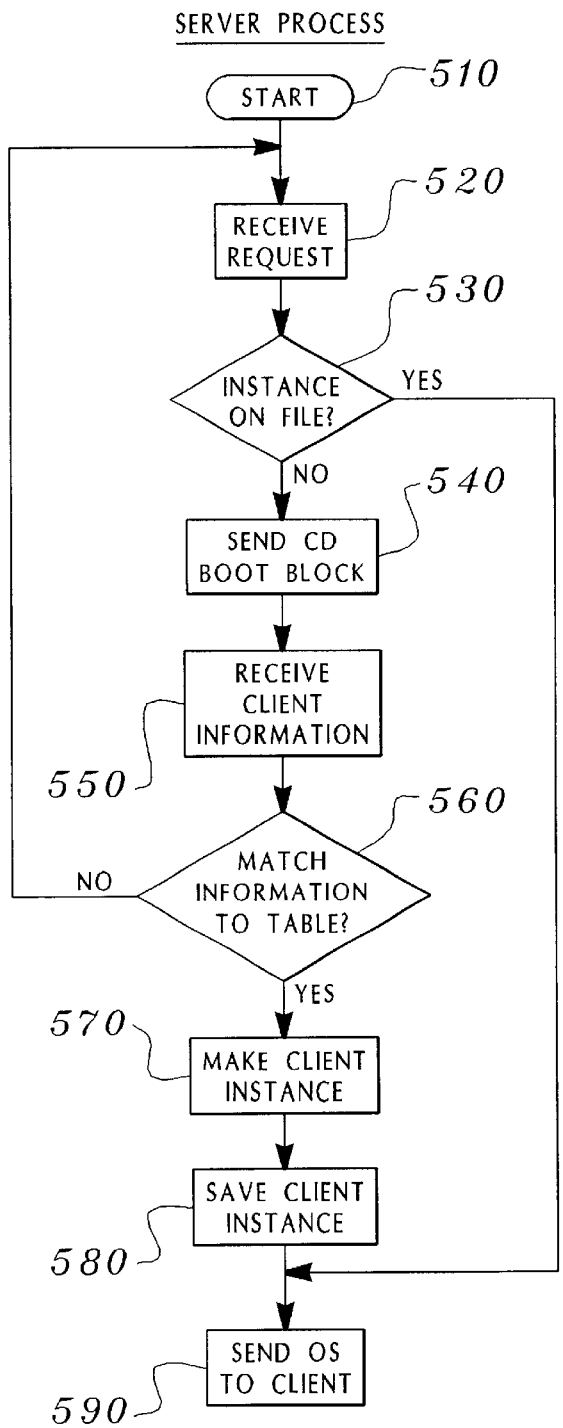
FIG. 6 depicts a flow chart of the server process.

With reference now to FIG. 5, a flowchart depicts the steps used in the CD process. The computer will be turned on (410) for the first time in the network. The client will receive the CD boot block (420). In the preferred embodiment, the CD boot block consists of RIPL DOS and the client information gathering program. Upon receipt of the CD boot block, the CD boot block acquires client information about the computer hardware and peripherals by scanning the hardware associated with the client computer and by prompting the user with questions if questions are included in the boot block (430). Client information may include but is not limited to items such as MAC address, network adapter type, video chipset, video RAM, primary hard disk size, RAM size, Machine type, machine serial number, BIOS flash level, PCI Codes of all PCI devices, descriptive strings of PCI devices, Universal Unique Identifier (UUID), Country, and CDROM type.

Client information may also be based on questions. The administrator may choose whatever information will distinguish one machine from another as client information items. Given two machines with identical hardware but different use functions such as a "front office" machine and a "back office" machine, there will be two machine classes. The hardware scan would not determine the difference in class. Therefore, the CD boot block may also prompt the user with questions to provide information to identify the function of the machine.

The CD boot block will then return the client information to the server (440). In the preferred embodiment, the client information is sent to a log file in the server. The client computer will reboot (450) and receive the appropriate operating system (460).

FIG. 5 depicts the process at the server. First the CD program receives the request from the client computer (510). The CD program determines whether or not it recognizes the client computer by determining if the client computer has an instance on file. The CD program sends the CD boot block to the client computer (520). If the server has the client computer's instance on file, the CD program will send the appropriate operating system to the client computer (590). If the server does not have the client computer's instance on file, the server will send the CD boot block to the client computer (540). The server will next receive the client information from the CD boot block (550) and store the client information in a log file. The client information in the log file will be identified by the client's MAC address. The Server CD program will then attempt to match the client information with a template table (560). The administrator has determined what information is critical to distinguishing one class from another and placed this information in one or more keys. The keys represent the critical information that distinguishes one class from another. For example, in a network where there are six types of machines and 4 types of machines have 16/4 Token Ring ISA adapters and the other two machines have IBM Ethernet Adapters, the two ethernet machines can be distinguished by video chipset alone, but the four Token ring machines require Video chipset and video ram to distinguish them apart. Therefore, two sets of keys are necessary. The keys are placed in a template table. The template table contains templates corresponding to the keys. The templates contain the information necessary to identify the operating system to be sent to the class of computer corresponding to the keys, the server which will send the operating system and the command to link the client machines MAC address to the template. If a match is not made, the program returns to a point prior to receiving a request and awaits the next request. If a match is made, the Server CD program automatically executes the command to link the template from the table with the client computer's MAC address (570). The Server CD program saves the instance in the memory of the server (580). The Server CD program then sends the appropriate Operating System to the client (590). The client instance is retained by the server and the next time the client seeks to boot its instance will be recognized and the appropriate operating system sent to the client computer.

The advantages provided by the present invention should be apparent in light of the detailed description provided above. The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention the practical application and to enable others of ordinary skill in the art to understand the invention for various embodiments with various modifications as are suited to the particular use contemplated.

What is claimed:

1. A method for automatically determining the class and creating an instance for one or more client computers having client information, said client computers turned on for the first time in a network having remote booting capability, comprising the steps of:

sending a CD boot block to the client computer;

acquiring the client information in the CD boot block;

sending the client information from the CD boot block to the server;

matching one or more keys from the client information with one or more keys in a template table; and responsive to making a match, creating an instance for said client computer.

2. The method of claim 1 further comprising, responsive to receiving client information in a file in the server, comparing one or more keys in the file to one or more keys in the template table.

3. The method of claim 1 further comprising the step of, responsive to creating the instance, saving said instance to a server memory.

4. The method of claim 1 further comprising the step of, responsive to a reboot by the client computer, sending an operating system corresponding to said instance to said client computer.

5. A programmable apparatus for automated determination of class and creation of an instance for a client computer turned on for the first time in a network having remote boot capability, said apparatus comprising, programmable hardware comprising;
at least one server computer; and
a plurality of workstation computers without an instance at the server;

a network connecting said server computer and said workstation computers;

a remote boot capability installed on said server computers and said workstation computers;

a client discovery program installed on said server computer;

a template table installed on said server;

wherein when said client computer is turned on, said client discovery program sends a CD boot block to said client computer;

wherein said CD boot block acquires client information and causes said client information to be sent to said server computer;

wherein, said client discovery program compares said client information to said template table;

wherein, responsive to matching one or more keys in said client information with one or more keys in said template table, said client discovery program creates an instance for said client computer; and responsive to creating an instance for said client computer, said client discovery program saves said instance in a memory in said server.

6. The programmable apparatus of claim 5 further comprising a plurality of network interface cards connected to said programmable hardware.

7. The programmable apparatus of claim 5 further comprising, wherein when said client computer reboots, an operating system corresponding to said instance will be sent to said client computer.

8. A computer readable memory for causing a first computer to discover the class of and create an instance for a plurality of second computers comprising:

a first computer readable storage medium;

a computer program stored in said storage medium;

the storage medium, so configured by said computer program, responsive to a request for an operating system by at least one second computer, causes the first computer to send a CD boot block to said second computer; and responsive to client information acquired by said CD boot block, causes the first computer to determine the class of said second computer; and responsive to determining the class of said second computer, causes the first computer to create an instance for said second computer.

9. The computer readable memory of claim 8 further comprising, responsive to determining the class of said second computer, causing said first computer to save said instance in said storage medium.

10. The computer readable memory of claim 8 further comprising, responsive to a reboot by said second computer, causing an operating system corresponding to said instance to be sent to said second computer.

11. A computer implemented process to automatically determine the class and create an instance for a client computer by a server computer comprising:

using a first computer, performing the following series of steps:
powering the first computer;
receiving a CD boot block in the second computer;
responsive to receiving said CD boot block, acquiring client information in said CD boot block;
responsive to acquiring said information in said CD boot block, sending said information to said network server;
responsive to rebooting, receiving an operating system from said network server;

using a second computer, performing the following series of steps:
sending a CD boot block to said first computer; and
responsive to receiving said client information from said first computer, comparing one ore more keys in said client information to one ore more keys in a template table;
responsive to matching one or more keys in said client information to one or more keys in said template table, creating an instance for said first computer.

12. The computer implemented process of claim 11 further comprising:

responsive to creating an instance for said first computer, saving said instance in the memory of said second computer; and responsive to said first computer rebooting, sending an operating system corresponding to said instance from said second computer to said first computer.

13. A method for automating administration of instance creation for a client computer at a server computer, the method comprising the computer implemented steps of:

sending a CD boot block to the client computer;

acquiring client information in the CD boot block from the client computer;

sending the client information from the CD boot block to the server;

comparing one or more keys from said client information to one ore more keys in a template table;

matching said one or more keys in said client information to one or more keys in said template table; and creating an instance for said client computer.

14. A computer program product on a computer-readable medium for automating instance creation for a client computer in a remote boot environment, the computer program product comprising:

first instructions from a first memory for sending a CD boot block to said client;

responsive to receiving said CD boot block in the client computer, second instructions for acquiring client information;

third instructions for sending said client information to said server;

fourth instructions for comparing one ore more keys from said client information to one ore more keys in a template table;

responsive to matching said one ore more keys in said client information to one ore more keys in said template table, fifth instructions for creating an instance for said client;

responsive to creating an instance, sixth instructions for saving said instance.

* * * * *